United States Patent
Zahedi et al.

(10) Patent No.: US 10,051,117 B2
(45) Date of Patent: Aug. 14, 2018

(54) SYSTEMS, METHODS, AND APPARATUSES FOR IDENTIFYING CABLE-LEVEL FAULTS IN A COPPER PLANT OF A DSL SYSTEM

(71) Applicant: Adaptive Spectrum and Signal Alignment, Inc., Redwood City, CA (US)

(72) Inventors: Arash Zahedi, Foster City, CA (US); Ehsan Ardestanizadeh, Oakland, CA (US); Mehdi Mohseni, Menlo Park, CA (US)

( * ) Notice: Subject to any disclaimer, the term of this patent is extended or adjusted under 35 U.S.C. 154(b) by 0 days.

(21) Appl. No.: 15/115,618

(22) PCT Filed: Jan. 30, 2014

(86) PCT No.: PCT/US2014/013793
§ 371 (c)(1),
(2) Date: Jul. 29, 2016

(87) PCT Pub. No.: WO2015/116091
PCT Pub. Date: Aug. 6, 2015

(65) Prior Publication Data
US 2017/0180549 A1   Jun. 22, 2017

(51) Int. Cl.
*H04M 1/24* (2006.01)
*H04M 3/08* (2006.01)
(Continued)

(52) U.S. Cl.
CPC .......... *H04M 3/306* (2013.01); *H04L 41/065* (2013.01); *H04L 41/0677* (2013.01); *H04L 43/16* (2013.01); *H04M 3/304* (2013.01)

(58) Field of Classification Search
CPC ...... H04M 11/062; H04M 3/306; H04M 1/24; H04M 3/30; H04M 3/304; H04M 3/34;
(Continued)

(56) References Cited

U.S. PATENT DOCUMENTS 6,144,721 A  * 11/2000 Stephens ................ H04M 1/24
                                                    324/520
6,987,837 B1 *  1/2006 Blank .................... H04M 1/24
                                                    379/1.01
(Continued)

FOREIGN PATENT DOCUMENTS

WO        2011065945        6/2011

OTHER PUBLICATIONS

Maes, J et al.: "Maximizing Digital Subscriber Line Performance", Bell Labs Technical Journal, Wiley, CA, US, vol. 1, No. 13, Mar. 21, 2008, pp. 105-115.*

(Continued)

*Primary Examiner* — Quoc D Tran
(74) *Attorney, Agent, or Firm* — North Weber & Baugh LLP

(57) ABSTRACT

In accordance with embodiments disclosed herein, there are provided apparatus, systems, and methods for identifying cable-level faults in a copper plant of a DSL system. For example, such means may include identifying a group of Digital Subscriber Lines (DSL lines) within a common cable; determining a baseline of physical line characteristics for each of the DSL lines in the group; collecting current physical line characteristics for each of the DSL lines in the group; determining a physical line characteristics delta for each of the DSL lines in the group by comparing the current physical line characteristics to the baseline of physical line characteristics for each of the respective DSL lines; and indicating a defect in the common cable based on a quantity of the DSL lines in the group for which the respective DSL line's physical line characteristics delta exceeds a threshold. Other related embodiments are disclosed.

29 Claims, 8 Drawing Sheets

(51) Int. Cl.
*H04M 3/22* (2006.01)
*H04M 3/30* (2006.01)
*H04L 12/24* (2006.01)
*H04L 12/26* (2006.01)

(58) Field of Classification Search
CPC ........ H04M 3/22; H04M 3/305; H04M 3/085; H04M 3/28
USPC .............. 379/1.01, 1.03, 1.04, 28, 29.01
See application file for complete search history.

(56) References Cited

U.S. PATENT DOCUMENTS

| | | | | |
|---|---|---|---|---|
| 2003/0112967 A1* | 6/2003 | Hausman | ............... | H04B 3/23 379/417 |
| 2009/0074153 A1* | 3/2009 | Wu | ............... | H04M 3/306 379/1.04 |
| 2009/0225672 A1* | 9/2009 | Yi | ............... | H04L 41/5035 370/252 |
| 2012/0140901 A1* | 6/2012 | Tennyson | ............... | H04M 3/306 379/27.01 |
| 2013/0051247 A1 | 2/2013 | Reese et al. | | |
| 2013/0154664 A1* | 6/2013 | Drooghaag | ............... | H04B 3/46 324/539 |
| 2014/0153377 A1* | 6/2014 | Snapir | ............... | H04B 3/32 370/201 |
| 2015/0341487 A1* | 11/2015 | Lu | ............... | H04B 3/32 379/1.03 |

OTHER PUBLICATIONS

International Search Report and Written Opinion for International Patent Application No. PCT/US14/13793 dated Oct. 16, 2014, 12 pages.

Maes, J. et al.: "Maximizing Digital Subscriber Line Performance", Bell Labs Technical Journal, Wiley, CA, US, vol. 1, No. 13, Mar. 21, 2008, 11 pages.

* cited by examiner

Wet Cable Algorithm

Cable Level Fault Algorithm

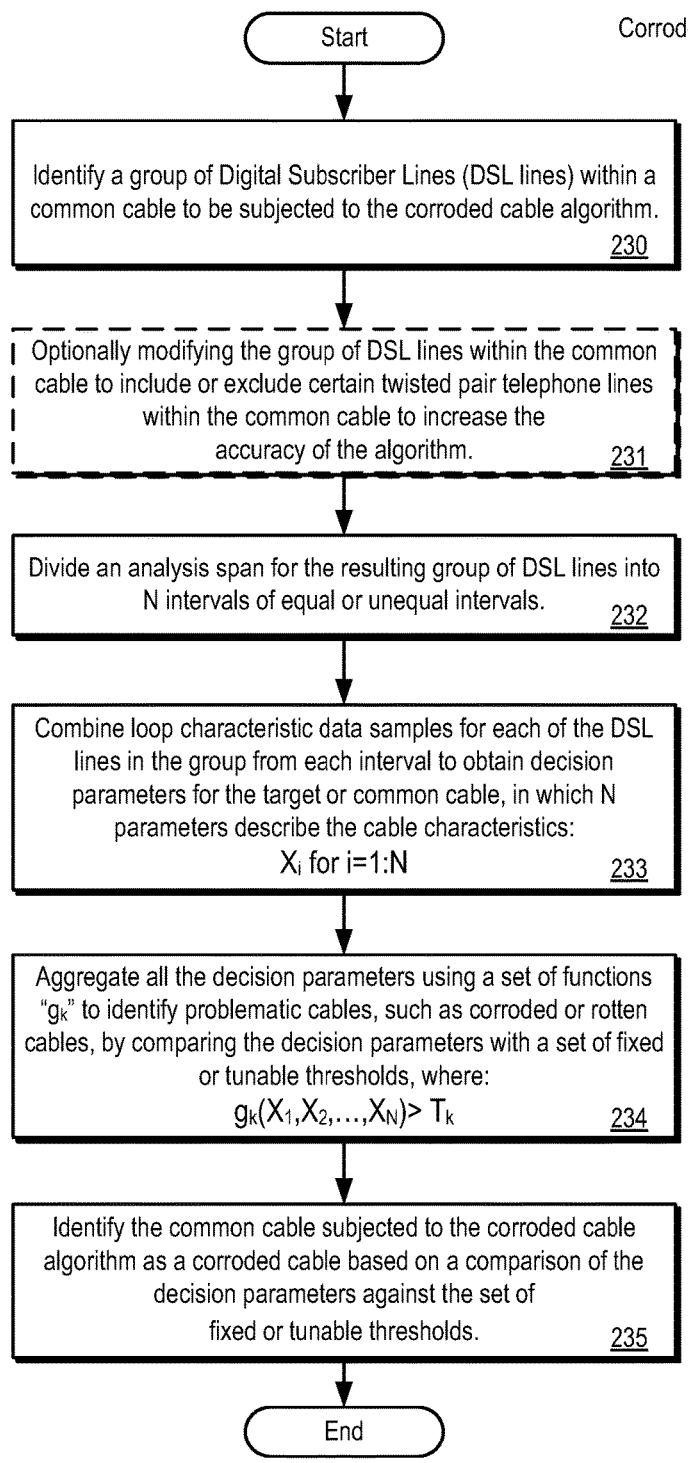

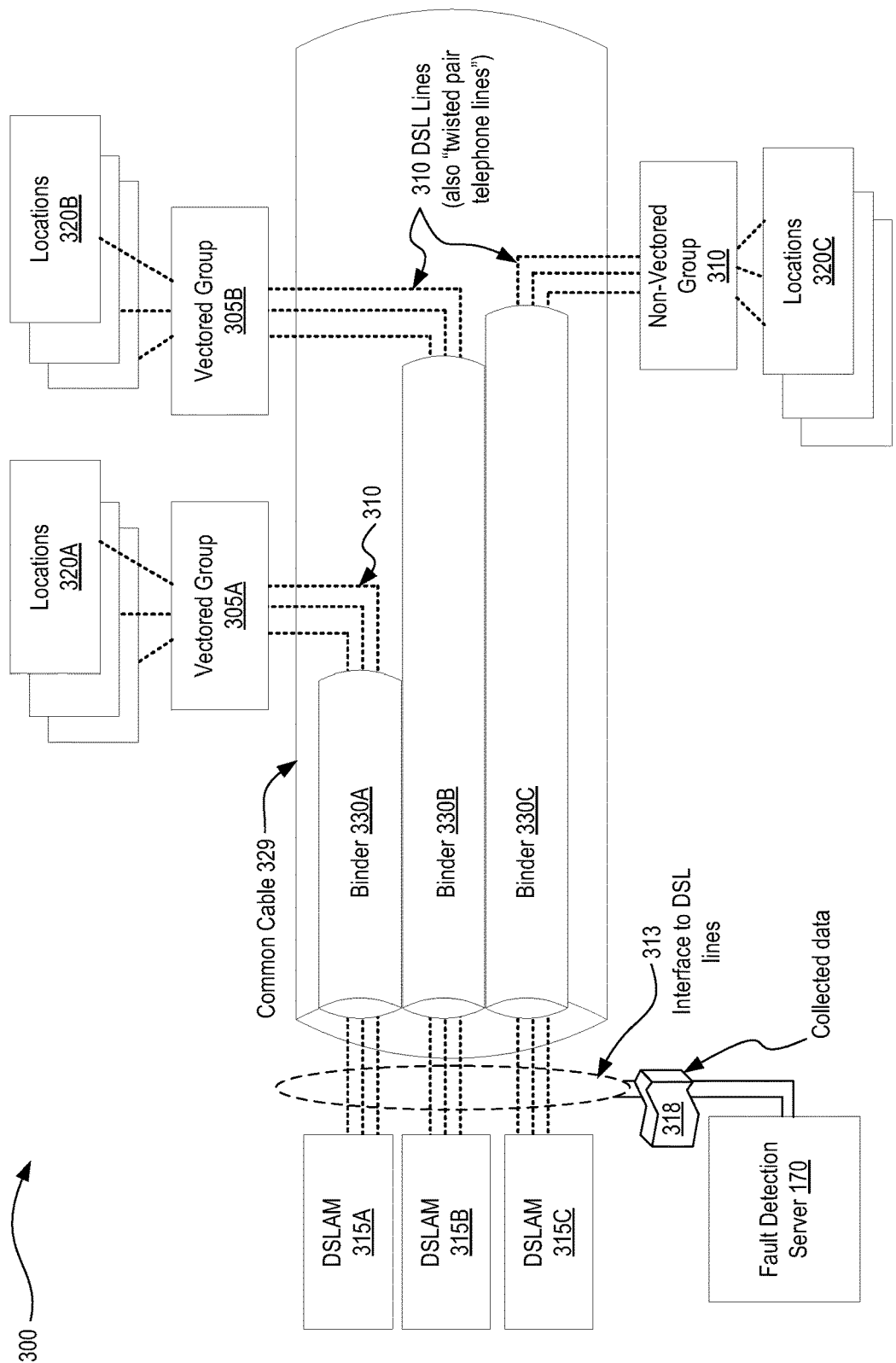

SYSTEMS, METHODS, AND APPARATUSES FOR IDENTIFYING CABLE-LEVEL FAULTS IN A COPPER PLANT OF A DSL SYSTEM

CLAIM OF PRIORITY

This application is a National Phase Application of, and claims priority to PCT Application No. PCT/US2014/013793, filed on 30 Jan. 2014, titled "SYSTEMS, METHODS, AND APPARATUSES FOR IDENTIFYING CABLE-LEVEL FAULTS IN A COPPER PLANT OF A DSL SYSTEM," which is incorporated herein by reference in entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems, methods, and apparatuses for identifying cable-level faults in a copper plant of a DSL system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Digital Subscriber Line (DSL) type communications represents a family of technologies used to provide broadband Internet access by transmitting digital data over the twisted pair telephone wires of a conventional telephone network. DSL service is commonly delivered simultaneously with wired telephone service on the same physical telephone line by utilizing higher frequency bands for data. Over time, the cables carrying the twisted pair telephone wires may become problematic in their operation, very often due to a defect in the cable carrying the twisted pair telephone wires. Such cable defects may negatively impact many customers of such DSL services simultaneously.

Conventional solutions for identifying cable faults include the use of Metallic Loop/Line Testing (MELT) functionality such as those described by TR-286 for verification of the subject line. A Digital Subscriber Line Access Multiplexer (DSLAM) may be enabled to carry out AC tests on the subject line but such tests are of limited value as they cannot identify the most common of line faults. Other past solutions include the coupling of DC test circuitry to the subject line to implement MELT testing functionality. Unfortunately, MELT testing results have generally proven to be insufficient to correctly identify line faults in the overwhelming majority of cases.

Improved technologies for identifying a problematic cable are needed to better optimize DSL communications as well as improve service to the customers that rely upon such DSL communication services.

The present state of the art may therefore benefit from systems, methods, and apparatuses for identifying cable-level faults in a copper plant of a DSL system as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2C illustrates a process flow to implement a corroded cable algorithm in accordance with one embodiment;

FIG. 3 illustrates an alternative exemplary architecture in which embodiments may operate;

DETAILED DESCRIPTION

Figure 1:
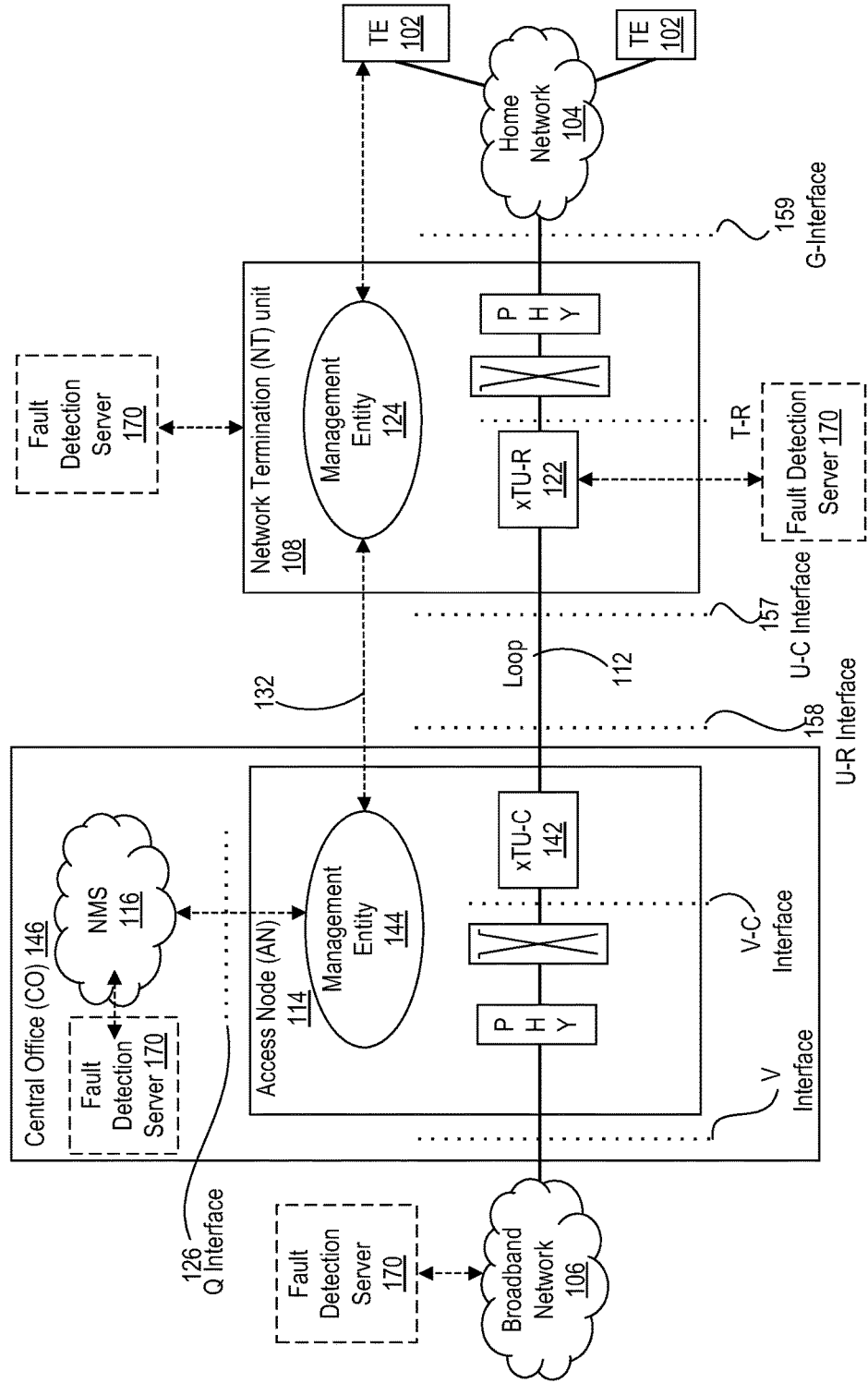
FIG. 1 illustrates an exemplary architecture in which embodiments may operate.

Described herein are apparatus, systems and methods for identifying cable-level faults in a copper plant of a DSL system.

In accordance with described embodiments, such means may include, for example: identifying a group of Digital Subscriber Lines (DSL lines) within a common cable; determining a baseline of physical line characteristics for each of the DSL lines in the group; collecting current physical line characteristics for each of the DSL lines in the group; determining a physical line characteristics delta for each of the DSL lines in the group by comparing the current physical line characteristics to the baseline of physical line characteristics for each of the respective DSL lines; and indicating a defect in the common cable based on a quantity of the DSL lines in the group for which the respective DSL line's physical line characteristics delta exceeds a threshold.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+ (G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding, and/or the G.997.1 standard (also known as G.ploam).

In accordance with embodiments described herein, end-user consumers, including residential consumers and business consumers, may connect to the Internet by way of a Wide Area Network (WAN) backhaul connection to a Service Provider (SP), such as an Internet Service Provider (ISP), or to a Service Provider that provides one or more of data connectivity, voice connectivity, video connectivity, and mobile device connectivity to a plurality of subscribers. Such Service Providers may include a Digital Subscriber Line (DSL) internet service provider which provides its subscribing end-users with Internet bandwidth at least partially over copper twisted pair telephone lines, such as that conventionally utilized to carry analog telephone service (e.g., Plain Old Telephone Service (POTS); a coaxial cable internet service provider which provides end-users with Internet bandwidth at least partially over coaxial cable, such as that conventionally utilized to carry "cable" television signals; or a fiber optics internet service provider which provides end-users with Internet bandwidth at over fiber optic cable that terminates at a customer's premises. Other variants exist as well, such as ISPs which provide Internet bandwidth as an analog signal over an analog telephone based connection, ISPs that provide Internet bandwidth over a one-way or two-way satellite connection, and ISPs that provide Internet bandwidth at least partially over power lines, such as power lines conventionally utilized to transmit utility power (e.g., electricity) to an end-user's premises, or ISPs that provide Internet bandwidth at least partially over wireless channels, such as wireless (e.g., WiFi) connectivity at hotspots, or mobile data connectivity via technologies and standards such as WiMax, 3G/4G, LTE, etc.

In performing the disclosed functions, systems may utilize a variety of operational data (which includes performance data) that is available at an Access Node (AN) as well as physical line characteristics related to the physical transmission media, such as the copper twisted pair telephone lines, over which data is communicated.

In FIG. 1, user's terminal equipment 102 (e.g., a Customer Premises Equipment (CPE) device or a remote terminal device, network node, LAN device, etc.) is coupled to a home network 104, which in turn is coupled to a Network Termination (NT) Unit 108. DSL Transceiver Units (TU) are further depicted (e.g., a device that provides modulation on a DSL loop or line). In one embodiment, NT unit 108 includes a TU-R (TU Remote), 122 (for example, a transceiver defined by one of the ADSL or VDSL standards) or any other suitable network termination modem, transceiver or other communication unit. NT unit 108 also includes a Management Entity (ME) 124. Management Entity 124 can be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program or via Transaction Language 1 (TL1) commands, TL1 being a long-established command language used to program responses and commands between telecommunication network elements.

Each TU-R 122 in a system may be coupled with a TU-C (TU Central) in a Central Office (CO) or other central location. TU-C 142 is located at an Access Node (AN) 114 in Central Office 146. A Management Entity 144 likewise maintains an MIB of operational data pertaining to TU-C 142. The Access Node 114 may be coupled to a broadband network 106 or other network, as will be appreciated by those skilled in the art. TU-R 122 and TU-C 142 are coupled together by a loop 112 (e.g., a "DSL loop" or a "DSL line"), which in the case of ADSL may be a twisted pair line, such as a telephone line, which may carry other communication services besides DSL based communications.

Several of the interfaces shown in FIG. 1 are used for determining and collecting operational data and/or physical line characteristics related to loop 112. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from TU-C 142, while far-end parameters from TU-R 122 may be derived by either of two interfaces over the UA interface.

Indicator bits and EOC messages may be sent using embedded channel 132 and provided at the Physical Medium Dependent (PMD) layer, and may be used to generate the required TU-R 122 parameters in ME 144. Alternately, the Operations, Administration and Maintenance (OAM) channel and a suitable protocol may be used to retrieve the parameters from TU-R 122 when requested by Management Entity 144. Similarly, the far-end parameters from TU-C 142 may be derived by either of two interfaces over the U-interface. Indicator bits and EOC message provided at the PMD layer may be used to generate the required TU-C 142 parameters in Management Entity 124 of NT unit 108. Alternately, the OAM channel and a suitable protocol may be used to retrieve the parameters from TU-C 142 when requested by Management Entity 124.

At the U interface (also referred to as loop 112), there are two management interfaces, one at TU-C 142 (the U-C interface 157) and one at TU-R 122 (the U-R interface 158). Interface 157 provides TU-C near-end parameters for TU-R 122 to retrieve over the U interface/loop 112. Similarly, U-R interface 158 provides TU-R near-end parameters for TU-C 142 to retrieve over the U interface/loop 112. The parameters that apply may be dependent upon the transceiver standard being used (for example, G.992.1 or G.992.2). The G.997.1 standard specifies an optional Operation, Administration, and Maintenance (OAM) communication channel across the U interface. If this channel is implemented, TU-C and TU-R pairs may use it for transporting physical layer OAM messages. Thus, the TU transceivers 122 and 142 of such a system share various operational data maintained in their respective MIBs.

Depicted within FIG. 1 is fault detection server 170 operating at various optional locations in accordance with several alternative embodiments. For example, in accordance with one embodiment, fault detection server 170 operates as a separate and physically distinct stand alone unit communicatively interfaced with broadband network 106, communicatively interfaced with NMS 116, communicatively interfaced with NT unit 108, or communicatively interfaced into xTU-R 122. In other embodiments, fault detection server 170 is integrated into existing components at the central office 146, at a third party provider connected via broadband network 106, or at the network termination unit 108. In certain embodiments, the fault detection server 170 operates within the cloud at the premises of a cloud services provider which provides software as a service in which the hardware of the fault detection server 170 is operated and controlled by the third party cloud services provider and accessible to subscribers via a public Internet, such as via broadband network 106.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For example, Public Switched Telephone Network (PSTN) used to provide DSL services to customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services and it shall be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

Figure 2A:
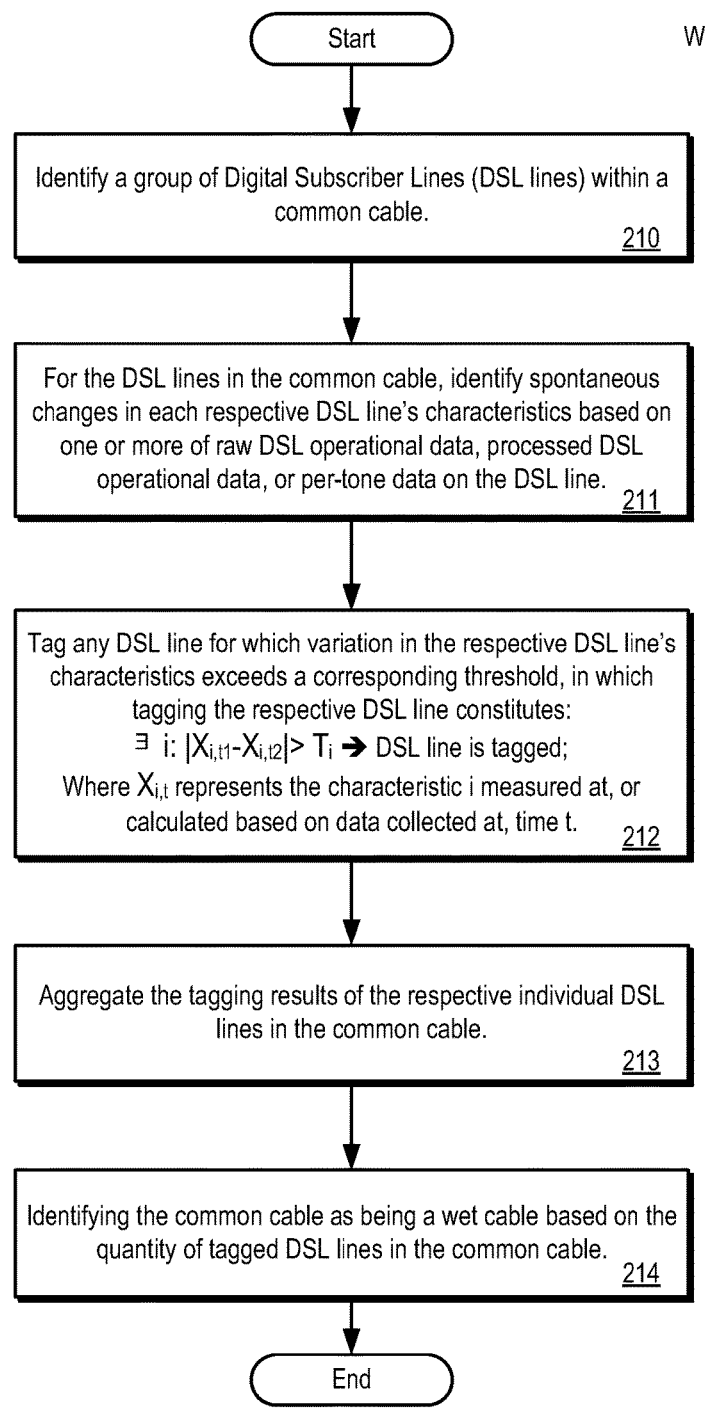
FIG. 2A illustrates a process flow to implement a wet cable algorithm in accordance with one embodiment.

FIG. 2A illustrates a process flow 201 to implement a wet cable algorithm in accordance with one embodiment. For instance, such operations as depicted by the flow 201 may be implemented by a fault detection server such as that depicted at element 170 of FIG. 1 or other capable systems and apparatuses as described herein.

Beginning with block 210, processing logic identifies a group of Digital Subscriber Lines (DSL lines) within a common cable.

At block 211, processing logic identifies, for each of the DSL lines in the common cable, spontaneous changes in each respective DSL line's characteristics based on one or more of raw DSL operational data, processed DSL operational data, or per-tone data on the DSL line.

At block 212, processing logic tags any DSL line for which variation in the respective DSL line's characteristics exceeds a corresponding threshold, in which tagging the respective DSL line constitutes: □i: $|X_{i,t1}-X_{i,t2}|>Ti \rightarrow DSL$ line is tagged; and where: $X_{i,t}$ represents the characteristic i measured at, or calculated based on data collected at, time t. For instance, any single or combination of collected data, either DSL operational data or per-tone data on the DSL line in a raw or processed form may constitute loop characteristics for the respective DSL line.

At block 213, processing logic aggregates the tagging results of the respective individual DSL lines in the common cable.

At block 214, processing logic identifies the common cable as being a wet cable based on the quantity of tagged DSL lines in the common cable. For instance, in certain embodiments when the majority of the DSL lines in the common cable are tagged within a given time-period, then the common cable will be identified as wet. The common cable may be identified as a wet cable based on the number of active pairs in the cable tagged, the ratio of active pairs tagged to total pairs present, the ratio of total active or inactive pairs tagged to total pairs present, etc. Any copper pair with at least one available data collection may be considered as an active pair. Alternatively, twisted pair telephone lines allocated to existing DSL service subscribers may be identified as active lines.

Further processing may optionally seek out to identify the exact location of the fault via single-ended loop testing (SELT) using any or all the lines in the common cable.

Figure 2B:
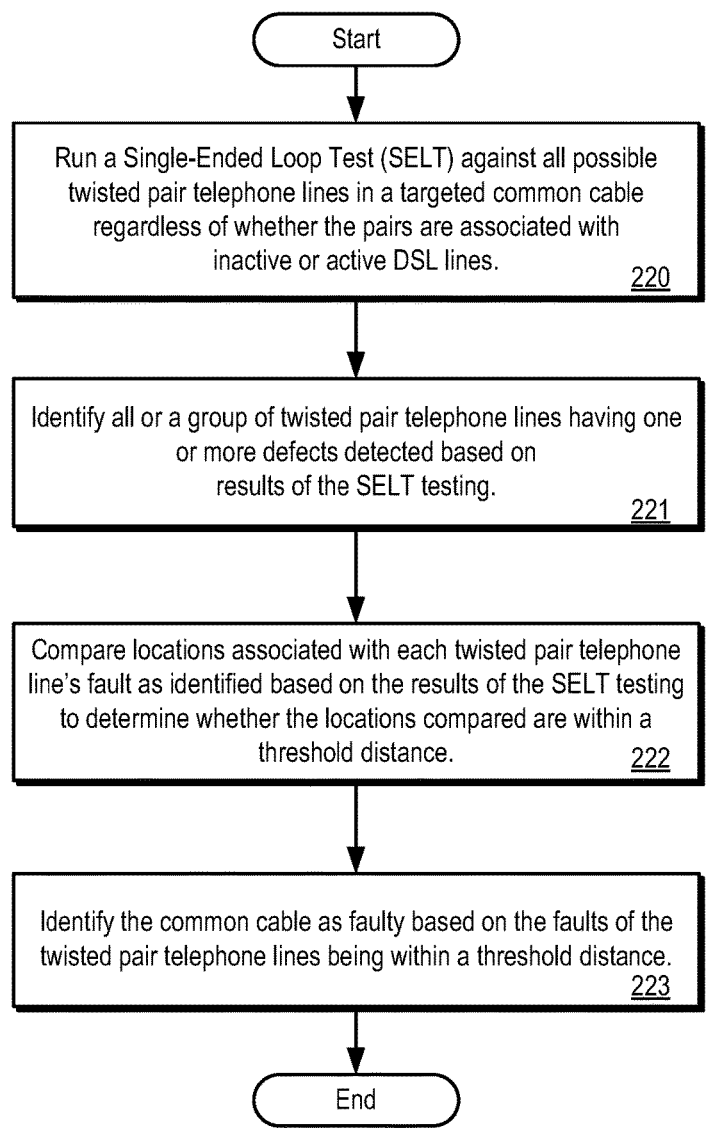
FIG. 2B illustrates a process flow to implement a cable level fault algorithm in accordance with one embodiment.

FIG. 2B illustrates a process flow 202 to implement a cable level fault algorithm in accordance with one embodiment. For instance, such operations as depicted by the flow 202 may be implemented by a fault detection server such as that depicted at element 170 of FIG. 1 or other capable systems and apparatuses as described herein.

Beginning with block 220, processing logic runs a Single-Ended Loop Test (SELT) against some or all possible twisted pair telephone lines in a targeted common cable regardless of whether the pairs are associated with inactive or active DSL lines.

At block 221, processing logic identifies all or a group of twisted pair telephone lines having one or more defects detected based on results of the SELT testing.

At block 222, processing logic compares locations associated with each twisted pair telephone line's fault as identified based on the results of the SELT testing to determine whether the locations compared are within a threshold distance. For instance, after running SELT on some or all of the DSL lines constituting the group and identifying the problematic DSL lines, pre-processing may be applied to exclude unrelated faults, such as a bridged-tap fault as identified by the SELT testing, subsequent to which the related faulty cables are compared based on the threshold distance.

At block 223, processing logic identifies the common cable as faulty based on the faults of the twisted pair telephone lines being within a threshold distance. For instance, where multiple faults are detected at a close enough distance amongst the various twisted pair telephone lines subjected to the SELT testing, it is highly likely that a cable level fault is present at that location.

Further processing may optionally seek out to correlate the distance and location information derived from the SELT testing to an exact geographic location corresponding to the identified cable level fault in the common cable such that a technician may be dispatched to remedy the fault.

FIG. 2C illustrates a process flow 203 to implement a corroded cable algorithm in accordance with one embodiment. For instance, such operations as depicted by the flow 203 may be implemented by a fault detection server such as that depicted at element 170 of FIG. 1 or other capable systems and apparatuses as described herein. The corroded cable algorithm may be utilized to identify corroded or rotten cables based on a long term study of the loop characteristics derived from a plurality of DSL lines in a common cable targeted by the algorithm.

Beginning with block 230, processing logic identifies a group of Digital Subscriber Lines (DSL lines) within a common cable to be subjected to the corroded cable algorithm. The algorithm is based on the long-term behavior of loop characteristics for the respective DSL lines of the common cable which are directly or indirectly a function of loop characteristics either part or the entirety of the xDSL frequency band. For instance, any or all of upstream attenuation, downstream attenuation, or an electrical equivalent loop length can be used by the algorithm as input data.

At block 231, processing logic optionally modifies the group of DSL lines within the common cable to include or exclude certain twisted pair telephone lines within the common cable to increase the accuracy of the algorithm. For instance, twisted pair telephone lines may be included in the group or excluded from the group based on the quantity of active DSL lines within the common cable or based on the quantity of active DSL lines to total twisted pair telephone lines present within the common cable, or to exclude known anomalies, such as a known wet DSL line or a particular DSL line already known and verified to be defective, or to restrict the group to only vectored DSL lines by eliminating all inactive and non-vectored DSL lines, or to restrict the group to only active but non-vectored DSL lines, or to exclude DSL lines from the group for which a technician dispatch is indicated within an analysis span, and so forth.

At block 232, processing logic divides an analysis span for the resulting group of DSL lines into N intervals of equal or unequal intervals.

At block 233, processing logic combines loop characteristic data samples for each of the DSL lines in the group from each interval to obtain decision parameters for the target or common cable, in which N parameters describe the cable characteristics: $X_i$ for i=1:N. For instance, the combining process may be any arbitrary linear or non-linear function of $X_i=f(a_{j,t})$ where $a_{j,t}$ is the input data for line j based on measurements at time t.

At block 234, processing logic aggregates all the decision parameters using a set of functions "$g_k$" to identify problematic cables, such as corroded or rotten cables, by comparing the decision parameters with a set of fixed or tunable thresholds, where: $g_k(X_1, X_2, \ldots, X_N)>T_k$.

At block 235, processing logic identifies the common cable subjected to the corroded cable algorithm as a corroded cable based on a comparison of the decision parameters against the set of fixed or tunable thresholds. If the decision parameters fall below the set of fixed or tunable thresholds then the cable would not be identified as a corroded cable.

FIG. 3 illustrates an alternative exemplary architecture 300 in which embodiments may operate. In particular, a common cable 329 is shown having binders 330A, 330B, and 330C therein. It is also permissible to have a cable with multiple twisted pair telephone but not divided into separate binders. In this particular illustration, binder 330A includes multiple twisted pair telephone lines including the DSL lines 310 connecting vectored group 305A with locations 320A via DSLAM 315A. Binder 330B similarly includes multiple twisted pair telephone lines including DSL lines 310 connecting vectored group 305B with locations 320B via DSLAM 315B. And binder 330C likewise includes multiple twisted pair telephone lines including DSL lines 310 connecting a non-vectored group 310 of lines with locations 320C via DSLAM 315C. The DSL lines 313 and various twisted pair telephone lines depicted are not necessarily active DSL lines communicating DSL data or even allocated to any particular DSL services subscriber, rather, it may be that some but not all of the twisted pair telephone line in any given binder 330A-C and within the common cable 329 are active whereas others remain inactive.

As noted above, the fault detection server 170 may perform various algorithms to identify cable-level faults in a copper plant of a DSL system including wet cables detection algorithms, corroded or rotten cable detection algorithms, and faulty cable detection algorithms. Fault detection server 170 may interface with the various DSL lines of the common cable 329 via the interface to the DSL lines at element 313 and may receive and collect data 318 via the same interface at element 313. Moreover, test probes may be injected onto the DSL lines 310 via the interface to the DSL lines at element 313.

Grouping of the DSL lines to be subjected to the various algorithms may be determined according to those lines particular binder 330A-C of a common cable, a common binder, or other cable hierarchies. Alternatively, groupings of the DSL lines may be determined based on those DSL lines which are vectored lines within the common cable 329, or those DSL lines which are non-vectored lines within the common cable 329, or those DSL lines which are not previously known faulty or known to be affiliated with a technician dispatch, or those DSL lines which operate according to a particular DSL protocol, and so forth.

Figure 4:
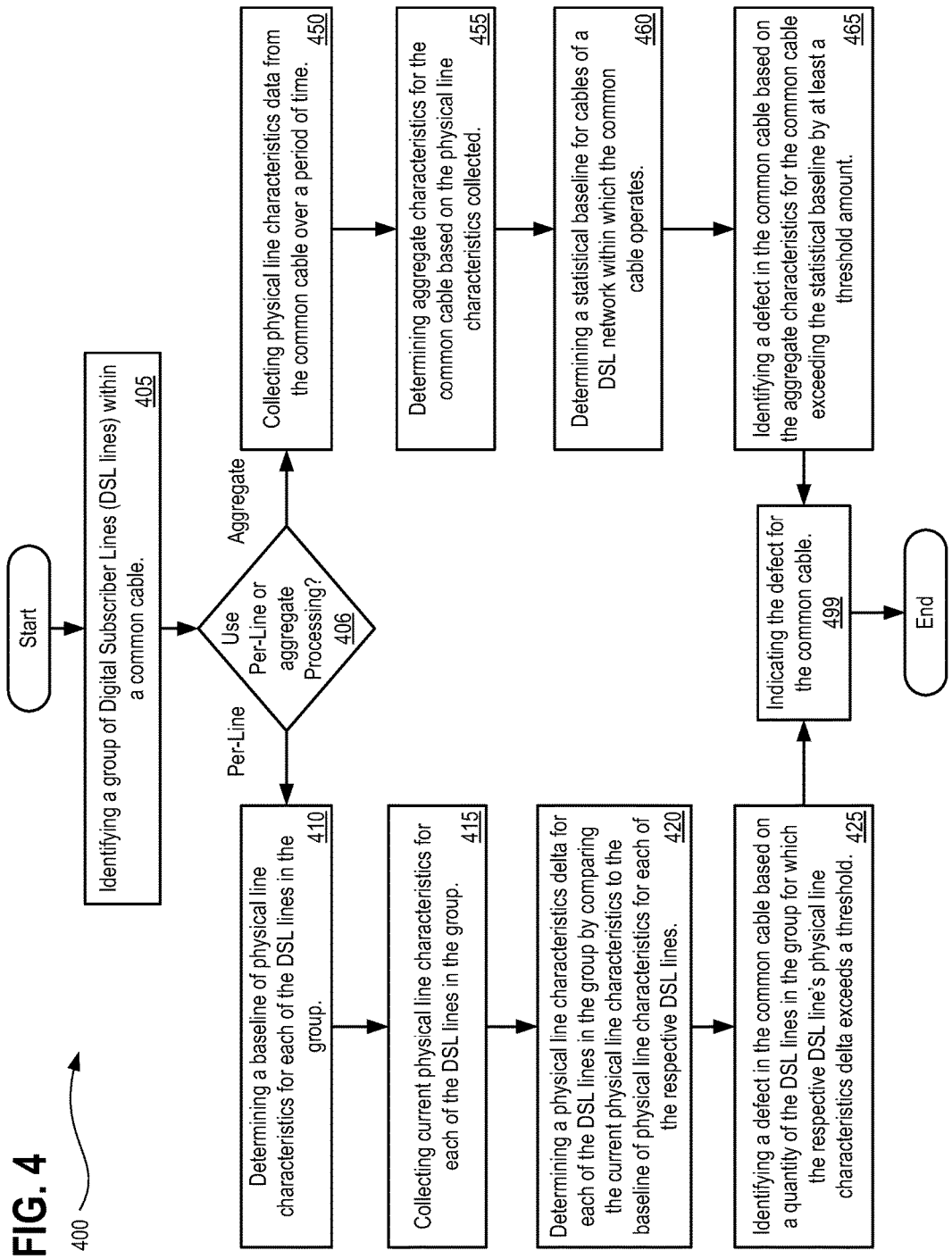
FIG. 4 is a flow diagram illustrating a method for identifying cable-level faults in a copper plant of a DSL system in accordance with described embodiments.

FIG. 4 is a flow diagram illustrating a method for identifying cable-level faults in a copper plant of a DSL system in accordance with described embodiments. Method 400 may be performed by processing logic that may include hardware (e.g., circuitry, dedicated logic, programmable logic, microcode, etc.), software (e.g., instructions run on a processing device to perform various operations such as interfacing functions, measuring, analyzing, communicating, configuring, collecting, receiving, modeling, quantifying, monitoring, estimating, identifying, determining, diagnosing and executing/initiating algorithms, or some combination thereof in support of the described methodologies). In one embodiment, method 400 is performed by a fault detection server such as that depicted at element 170 of FIG. 1, element 500 of FIG. 5, and/or by the machine at element 600 of FIG. 6. Some of the blocks and/or operations listed below are optional in accordance with certain embodiments. The numbering of the blocks presented is for the sake of clarity and is not intended to prescribe an order of operations in which the various blocks must occur. Additionally, operations from method 400 may be utilized in a variety of combinations with any of the other process flows and their respective operations, including process flows 201, 202, and 203 as set forth by FIGS. 2A, 2B, and 2C respectively.

At block 405, processing logic identifies a group of Digital Subscriber Lines (DSL lines) within a common cable.

Processing may proceed via the left or right paths based on whether the processing and applied algorithm utilizes per-line or aggregate processing as indicated by decision point 406. If at decision point 406, the processing is to utilize per-line processing, then the flow advances to block 410.

At block 410, processing logic determines a baseline of physical line characteristics for each of the DSL lines in the group.

At block 415, processing logic collects current physical line characteristics for each of the DSL lines in the group.

At block 420, processing logic determines a physical line characteristics delta for each of the DSL lines in the group by comparing the current physical line characteristics to the baseline of physical line characteristics for each of the respective DSL lines.

At block 425, processing logic identifies a defect in the common cable based on a quantity of the DSL lines in the group for which the respective DSL line's physical line characteristics delta exceeds a threshold.

Flow then advances to block 499 where processing logic indicates the defect for the common cable, subsequent to which, processing ends.

Alternatively, if at decision point 406, the processing is to utilize aggregate processing, then the flow advances to block 450.

At block 450, processing logic collects physical line characteristics data from the common cable over a period of time.

At block 455, processing logic determines aggregate characteristics for the common cable based on the physical line characteristics collected.

At block 460, processing logic determines a statistical baseline for cables of a DSL network within which the common cable operates. For instance, such a statistical baseline may be representative of all cables within the DSL network and indicative of their normal or expected behavior, operation, and characteristics, such as expected upstream attenuation, expected downstream attenuation, expected Hlog, expected Single-Ended Loop Test (SELT) results, expected Dual-End Line Testing (DELT) results, etc. Alternatively, the determined statistical baseline may be based upon a statistical sampling of cables in the DSL network within the common cable operates or previously observed values of other cables within the DSL network aggregated to form a statistical baseline to which any given cable in the network may be compared.

At block 465, processing logic identifies a defect in the common cable based on the aggregate characteristics for the common cable exceeding the statistical baseline by at least a threshold amount. For instance, the statistical baseline may establish an expected value of 1.0 for the aggregate characteristics measured from any given cable in the DSL network and results varying from that expected value by some amount may therefore be identified as having a defect. The threshold values may be tunable and adapted based on a variety of design considerations, and as such, it may be that a 1.1 returned value for the determined aggregate characteristics is sometimes acceptable and 1.2 is not, whereas at other times, higher or lower thresholds, percentages, or variances are utilized.

In some embodiments the data collected over a period of time constitutes an analysis span which is then divided into N intervals of equal or unequal lengths, and the defect in the common cable is then identified based upon consideration of the determined aggregate characteristics for the common cable in the respective N intervals as compared to the statistical baseline to determine which of the N intervals vary from the statistical baseline by more than the established threshold amount.

Flow then advances to block 499 where processing logic indicates the defect for the common cable, subsequent to which, processing ends.

In accordance with another embodiment, method 400 further includes: tagging as an impaired DSL line, any of the DSL lines in the group for which the physical line characteristics delta of the respective DSL line exceeds the threshold; and in which indicating the defect in the common cable includes indicating the defect based on the quantity of the DSL lines having been tagged as impaired.

According to another embodiment of method 400, indicating the defect in the common cable includes: determining the defect in the common cable is present based on a ratio of the DSL lines in the group for which the respective DSL line's physical line characteristics delta exceeds the threshold to a total quantity of DSL lines in the group; and indicating the defect in the common cable when the ratio exceeds a second threshold.

According to another embodiment of method 400, identifying the group of DSL lines within the common cable includes one of: (i) identifying the group of DSL lines, in which each of the DSL lines in the group are active DSL lines actively carrying DSL communication signals to DSL service subscribers; (ii) identifying the group of DSL lines, in which each of the DSL lines in the group are inactive DSL lines allocated to DSL service subscribers; and (iii) identifying the group of DSL lines, in which the DSL lines in the group include both active DSL lines and inactive DSL lines.

According to another embodiment of method 400, indicating the defect in the common cable includes one of: (i) determining a majority of the DSL lines in the group possess a defect based on comparing the current physical line characteristics to the baseline of physical line characteristics; (ii) determining the quantity of the DSL lines in the group for which the respective DSL line's physical line characteristics delta exceeds a threshold is greater in number than an absolute threshold of permissibly defective DSL lines for the common cable; and (iii) determining two or more of the DSL lines in the group for which the respective DSL line's physical line characteristics delta exceeds a threshold reside within a threshold distance of one another based on Single-Ended Loop Test (SELT) results for the two or more DSL lines.

In accordance with another embodiment, method 400 further includes: performing short term analysis to indicate whether the common cable is a wet cable; in which determining the baseline of physical line characteristics for each of the DSL lines in the group includes collecting current physical line characteristics for each of the DSL lines in the group at a first time; in which collecting the current physical line characteristics for each of the DSL lines in the group includes collecting the current physical line characteristics again at a second time separated from the first time by less than 48 hours; and in which indicating the defect in the common cable includes indicating the common cable is a wet cable based on the quantity of the DSL lines in the group for which the respective DSL line's physical line characteristics delta exceeds a threshold for change between the first time and the second time separated by the less than 48 hours.

In other embodiments, the algorithm may is applied or backdated to older data which is not reflected by the current physical line characteristics collected for each of the DSL lines in the group. For instance, where the current data encompasses a 48-hour period of time, certain embodiments may utilize only the collection period of the exemplary 48-hour time period whereas other embodiments will utilize the current data in addition to previously collected historical data, for instance, by applying or back-dating the algorithm to data three days into the past, weeks into the past, six months into the past, and so forth. For instance, if current attenuation data is collected for a given line and compared to attenuation data collected for the same line a day prior, then the algorithms are able to identify whether a wet cable condition exists. However, it is equally possible to apply the wet cable algorithm to attenuation data collected six days ago and compare it with attenuation data collected for the same line seven days ago, thus operating in a purely historical mode without regard to current physical line characteristics for the DSL line. Such a historical operating mode may be useful when data is collected on an on-going basis but uploaded or processed in batches at a later time.

According to such embodiments, the algorithm attempts to identify the problematic cables by determining that too many of the DSL lines in a common cable are associated with a defect. For example, if a problem exists for the majority of the lines in the common cable identified based on the short-interval period analyzed then the cable will be flagged as a wet cable. This possible because a common cable carrying DSL lines may operate perfectly well during a dry period, but then shortly after a rainfall or flooding situation, the same cable can become inundated with moisture causing a statistically significant change in the DSL line characteristics of the respective DSL lines in the common cable. Where a sufficient number of the DSL lines in the common cable exhibit a change in excess of the established threshold, the algorithm indicates that the common cable is a wet cable.

The short term intervals of hours or days may be repeated through several iterations as necessary and multiple such intervals may be taken as utilized as inputs for the wet cable algorithm, however, the short duration permits the algorithm to be sufficiently sensitive to spontaneous and sudden changes in the physical line characteristics of the respective DSL or twisted pair telephone lines that make up the common cable.

In accordance with another embodiment, method 400 further includes: performing long term analysis to indicate whether the common cable is a corroded cable; in which determining the baseline of physical line characteristics for each of the DSL lines in the group includes collecting current physical line characteristics for each of the DSL lines in the group at a first time; in which collecting the current physical line characteristics for each of the DSL lines in the group includes collecting the current physical line characteristics again at a second time separated from the first time by a configurable time span; and in which indicating the defect in the common cable includes indicating the common cable is a corroded cable based on the quantity of the DSL lines in the group for which the respective DSL line's physical line characteristics delta exceeds a threshold for change between the first time and the second time separated by the configurable time span. According to one embodiment, performing long term analysis to indicate whether the common cable is a corroded cable further includes establishing the group of DSL lines to include all lines in the common cable subjected to the corroded cable analysis.

For instance, if the changes are not so sudden as to reveal themselves through analysis of day-to-day changes then capturing changes over a longer period of time and subjecting those changes to analysis may permit the algorithm to indicate a different kind of fault, specifically, a corroded or rotten cable.

In yet other embodiments, analysis of changes captured over a period of time may be subjected to a comparison of expected nominal behavior for a set of DSL lines within a common cable versus the measurements of current physical line characteristics captured at one or more time intervals.

In accordance with another embodiment, method 400 further includes: performing long-term threshold analysis to indicate whether the common cable has a defect; in which determining the baseline of physical line characteristics for each of the DSL lines in the group includes retrieving expected line characteristics for each of the DSL lines in the group based on one or more of upstream attenuation, downstream attenuation, known line length, or estimated line length for each respective DSL line in the group; and in which determining the physical line characteristics delta for each of the DSL lines in the group comprises a comparison of the expected line characteristics for each DSL line with the corresponding current physical line characteristics.

Thus, based on time variation analysis of raw DSL operational data, processed DSL operational data, or per-tone data on the DSL line, possibly combined with neighborhood information and/or statistical data for the DSL lines, a determination is made on a per-line basis for all the DSL or twisted pair telephone lines in the group whether a defect exists based on a comparison to thresholds, and then the common cable is collectively evaluated to determine whether a defect of some kind exists for the common cable based on the quantity of individual DSL or twisted pair telephone lines that were individually determined to have a defect.

According to another embodiment of method 400, identifying the group of DSL lines within the common cable includes identifying any twisted pair telephone lines and any DSL lines within the common cable regardless of whether DSL data transmission activity is present on any of the twisted pair telephone lines and the DSL lines. In such an embodiment, the method 400 further includes some but not all of the identified twisted pair telephone lines and the DSL lines to form the group of DSL lines or excludes some but not all of the identified twisted pair telephone lines and the DSL lines to form the group of DSL lines.

According to another embodiment of method 400, the including or excluding constitutes one of: (i) including all DSL lines determined to be allocated to a DSL services subscriber regardless of whether the identified DSL lines are active or inactive; (ii) restricting the group of DSL lines to all active DSL lines within a single vectored group of DSL lines; (iii) restricting the group of DSL lines to all active DSL lines utilizing a specified DSL protocol, the DSL protocol being one of VDSL or ADSL; (iv) restricting the group of DSL lines to any lines within a single one of a plurality of DSL binders within the common cable, the DSL binder having a subset of the DSL lines or twisted pair telephone lines of the common cable therein; (v) excluding from the group of DSL lines any DSL line associated with a vectored group of DSL lines; (vi) restricting the group of DSL lines to all active DSL lines in the common cable not affiliated with any vectored group; (vii) excluding any DSL lines or twisted pair telephone line previously known to have a defect or previously known to be associated with a technician dispatch during an evaluation period or within a threshold period of time or previously known to exhibit statistical outlier physical loop characteristics; (viii) excluding any twisted pair telephone lines transmitting analog voice signals in support of Plain Old Telephone Service (POTS) without concurrently carrying digital signals in support of DSL communication services; and (ix) including all DSL lines determined to be actively transmitting DSL communication data.

According to another embodiment of method 400, collecting current physical line characteristics for each of the DSL lines in the group includes running a Single-Ended Loop Test (SELT) against all possible twisted pair telephone lines within the common cable regardless of whether the twisted pair telephone lines are associated with inactive or active DSL lines.

In accordance with another embodiment, method 400 further includes: comparing locations associated with each twisted pair telephone line having a fault as identified via results of the SELT test to determine whether the locations compared are within a threshold distance.

In accordance with another embodiment, method 400 further includes: performing a Single-Ended Loop Test (SELT) against the DSL lines in the group; and correlating results of the SELT test to a geographic location representing where the SELT test indicates a fault exists on the common cable.

In accordance with another embodiment, method 400 further includes: triggering a notification indicating the common cable possesses the fault at the geographic location; and in which triggering a notification includes one or more of: (i) sending an email notification; (ii) sending a Short Message Service (SMS) notification; (iii) posting a notification to a social network; (iv) triggering a graphical notification to a user interface; (v) auto-generating a trouble ticket; (vi) auto-generating a technician dispatch report; (vii) auto-generating a work order; or (viii) auto-generating a list of tickets or a list of work orders.

According to another embodiment of method 400, collecting current physical line characteristics for each of the DSL lines in the group includes one or more of: (i) collecting upstream attenuation for each of the DSL lines in the group; (ii) collecting downstream attenuation for each of the DSL lines in the group; (iii) collecting an estimated loop length for each of the DSL lines in the group; (iv) collecting Hlog for each of the DSL lines in the group, where the Hlog represents one or more of a transfer function magnitude for the respective DSL line, a measure of attenuation per Power Spectral Density (PSD) carrier of each respective DSL line, or a measure of insertion loss for the respective DSL line; (v) collecting physical loop characteristics for each of the DSL lines in the group derived from Single-Ended Loop Test (SELT) results for the respective DSL line; and (vi) collecting physical loop characteristics for each of the DSL lines in the group derived from Dual-End Line Testing (DELT) results for the respective DSL line.

For instance, a variety of diagnostic prime codes may be utilized to carry out the evaluations including estimated and evaluated the loop lengths as determined by DSL analysis software, measured Hlog, measured attenuations in both the upstream and downstream directions, and so forth. When using attenuation the system may collect the value at a first instance in time and then collect the value again at a second instance in time and then determine whether any sudden change, such as a jump in attenuation, exists between the evaluation periods. For instance, a jump in attenuation in excess of a threshold, such as a jump of 10% or 16%, may be indicative of a problem with a particular DSL line within the common cable.

If the majority of the DSL lines in the common cable, or a number in excess of a threshold quantity of lines, or a ratio of the lines in excess of a threshold similarly exhibit such a jump in attenuation, then it is likely that the common cable possesses a defect which in turn likely impairs DSL service quality delivered to the DSL service customers communicatively interfaced to the CO via that particular common cable.

Monitoring may utilize evaluation periods looking for a jump in excess of a threshold in the DSL lines of the common cable based on a same day basis, for instance, by using hour by hour analysis, or based on a jump in the DSL lines of the common cable on a day-to-day rate of change.

As noted above, the method may likewise use an evaluated loop length or an "electrical equivalent" of the loop length for each of the DSL lines in the group, for instance, by retrieving the evaluated loop length for each given DSL line from DSL analysis software which performs analysis on the DSL line's physical loop characteristics to arrive upon an evaluated loop length. Using the evaluated loop length, problems may again be identified, for instance, where higher attenuation causes a DSL line to be evaluated as having a higher loop length when in reality it is known to be of a shorter loop length, or where the evaluated loop length deviates from a prior established baseline or an earlier interval's measurement.

In accordance with another embodiment, method 400 further includes: generating a corrected baseline of physical line characteristics for each of the DSL lines in the group by adjusting the baseline to account for expected and permissible seasonal variation and/or temperature variation; and in which determining the physical line characteristics delta for each of the DSL lines in the group includes comparing the current physical line characteristics to the corrected baseline of physical line characteristics.

According to another embodiment of method 400, adjusting the baseline to account for expected and permissible seasonal variation and/or temperature variations includes adjusting upstream and/or downstream attenuations recorded in the baseline based on any of statistical temperature fluctuations, historical temperature fluctuations, current temperature fluctuations, geographic region, or season.

The problem of evaluating a DSL line's physical loop characteristics is made more difficult by the fact that changes in the physical loop characteristics are known and expected to change over time due to shifting of the seasons, especially changes in temperature of the ambient environment through which a copper twisted pair telephone line traverses between a CO and CPE at a DSL subscriber's location. Thus, any shift in attenuation or any other physical loop characteristic does not necessarily equate to a defect for the common cable or the DSL lines within such a cable. With respect to corrosion or rotted cables the changes must sufficiently deviate from a baseline over a longer analysis span which is corrected for expected changes owing to the changes in the seasons and temperature fluctuations and not merely attributable to the changing seasons. Wet-cable faults require a more sudden change and as such, may not require corrections for seasonal change.

In accordance with certain embodiments, the physical loop characteristics of the respective DSL lines in the group are observed over a period of time to establish the baseline of physical line characteristics for each of the DSL lines in the group. With the baseline established, expected performance or expected physical loop characteristics can be monitored to determine what, if any, deviation occurs from the baseline. Deviations in excess of a threshold may then be utilized to flag individual lines or collectively determine that a common cable possesses a defect based on a quantity of the DSL lines in the group having been flagged or tagged as having such a defect. The period of time over which measurements are established and the deviation observed may correlate to hour over hour, day over day, week over week, month over month, season over season, or year over year, and depending on the extent of deviation and the duration of the measurement, different types of defects for the common cable may thus be determined.

The respective DSL lines will exhibit fluctuations as part of their normal behavior. Some change over time is therefore expected to be reflected as small variations in the physical line characteristics for the respective DSL lines of the group, commonly attributable to temperature change in the operational environment of the DSL lines. Since temperature changes from summer to winter it is expected to see more or less attenuation on the DSL lines as well as changes in other physical line characteristics. Normal or expected behavior for any given DSL line therefore is not static, but rather, such expected changes are accommodated by adjusting the baseline to account for normal fluctuation in accordance with certain embodiments.

In accordance with certain embodiments, the baseline is derived from analysis of a statistical population. For instance, the baseline may be determined based upon analysis of an exemplary 10% population of twisted pair telephone lines in a cable or lines amongst multiple cables, the statistically derived baseline then being utilized for all cables subjected to the analysis and algorithms in a given region or for the complete population represented by the statistically derived baseline. Based on the baseline statistically calculated on a sub-population of the DSL lines or cables within a DSL network, the vast majority of the population of cables will behave normally according to the statistically derived baseline. Where the statistically derived baseline represents a time period sufficiently long to represent the changing seasons and temperature variations, the statistically derived baseline will in turn additionally account for such seasonal changes and temperature changes over time without requiring further adjustment. Problematic cables can then readily be discovered by observing current physical line characteristics for the DSL lines in a common cable and comparing various intervals of the collected current physical line characteristics as well as comparing the collected current physical line characteristics to the statistically derived baseline or to expected behavior based on such a statistically derived baseline as very few cables or their respective DSL lines will deviate from the statistically derived baseline when not afflicted with some kind of a defect.

In accordance with another embodiment, method 400 further includes: storing the baseline of physical line characteristics for each of the DSL lines in a database as historical data for the respective DSL lines in the common cable.

According to another embodiment of method 400, determining a baseline of physical line characteristics for each of the DSL lines in the group includes determining the baseline based on (i) the historical data for the respective DSL lines in the common cable stored in the database and further based on one or more of (ii) newly observed current physical line characteristics for each of the DSL lines in the group or (iii) statistical data retrieved for each of the respective DSL lines in the group.

In accordance with another embodiment, method 400 further includes: determining a baseline of operational line characteristics for each of the DSL lines in the group; collecting current operational line characteristics for each of the DSL lines in the group; and determining an operational line characteristics delta for each of the DSL lines in the group by comparing the current operational line characteristics to the baseline of physical line characteristics for each of the respective DSL lines. According to such an embodiment, indicating a defect in the common cable therefore further includes indicating the defect in the common cable based on a quantity of the DSL lines in the group for which the respective DSL line's operational line characteristics delta exceeds an operational change threshold in addition to the quantity of the DSL lines in the group for which the respective DSL line's physical line characteristics delta exceeds the first threshold.

According to another embodiment of method 400, each respective DSL line's operational line characteristics includes at least per-tone data of the respective DSL line; and in which indicating the defect in the common cable is based at least in part on a change in the per-tone data of any one of the DSL line's per-tone data exceeding the operational change threshold.

In accordance with another embodiment, method 400 further includes: storing the baseline of physical line characteristics for each of the DSL lines and a second baseline of operational line characteristics for each of the DSL lines in the group as historical data; and in which indicating the defect in the common cable further includes indicating the defect in the common cable based at least in part on historical data representing both physical line characteristics and operational line characteristics for each of the DSL lines in the group.

Physical line characteristics are different from operational line characteristics. Such operational line characteristics include metrics such as data rate and transmit power.

According to another embodiment of method 400, collecting the current physical line characteristics for each of the DSL lines in the group includes collecting the current physical line characteristics over a period of time defined by an analysis span for the group of the DSL lines; in which the method further includes: dividing the analysis span into N intervals of equal or unequal intervals; and in which indicating the defect in the common cable is based further on analysis of the physical line characteristics for the respective DSL lines from a plurality of the N intervals.

For example, the duration of behavior attributable to the winter season may differ in length from the duration of behavior attributable to the summer season, resulting in a difference in the amount of physical line characteristics collected for the respective DSL lines in each of the winter and summer seasons. It may therefore be preferable in certain embodiments to divide the analysis span into unequal intervals. In other embodiments where normalized values are utilized or where a corrected or adjusted baseline is utilized, it may be simpler or preferable to utilize equal intervals of the analysis span, notwithstanding such differences in the duration of the seasons.

According to another embodiment of method 400, indicating a defect in the common cable is based further on a determined volatility in the current physical line characteristics for each of the DSL lines in the group compared to a volatility threshold.

According to another embodiment of method 400, the fault detection server is implemented by a third party service provider different than a DSL operator responsible for networking equipment to operate the DSL lines and different than a DSL services provider responsible for providing DSL communication services to DSL service customers; and in which the fault detection server communicably interfaces to the DSL lines over a public Internet through DSL networking elements of the DSL system operator or the DSL services provider.

According to another embodiment of method 400, the third party service provider provides cable-level fault detection services on common cables encompassing DSL lines as a subscription based cloud service.

According to a particular embodiment, there is a non-transitory computer readable storage medium having instructions stored thereon that, when executed by a processor, the instructions cause the processor to perform operations including: identifying a group of Digital Subscriber Lines (DSL lines) within a common cable; determining a baseline of physical line characteristics for each of the DSL lines in the group; collecting current physical line characteristics for each of the DSL lines in the group; determining a physical line characteristics delta for each of the DSL lines in the group by comparing the current physical line characteristics to the baseline of physical line characteristics for each of the respective DSL lines; and indicating a defect in the common cable based on a quantity of the DSL lines in the group for which the respective DSL line's physical line characteristics delta exceeds a threshold.

According to another embodiment, the instructions of the non-transitory computer readable storage media cause the fault detection server to perform operations further including: tagging as an impaired DSL line, any of the DSL lines in the group for which the physical line characteristics delta of the respective DSL line exceeds the threshold; and in which indicating the defect in the common cable includes indicating the defect based on the quantity of the DSL lines having been tagged as impaired.

According to another embodiment of the non-transitory computer readable storage media, indicating the defect in the common cable includes determining the defect in the common cable is present based on a ratio of the DSL lines in the group for which the respective DSL line's physical line characteristics delta exceeds the threshold to a total quantity of DSL lines in the group; and indicating the defect in the common cable when the ratio exceeds a second threshold.

In accordance with an alternative embodiment, there is a method at a fault detection server having at least a processor and a memory, in which the method includes: identifying a common cable having a plurality of twisted pair telephone lines therein; determining a group of active Digital Subscriber Lines (DSL lines) as a sub-set of the twisted pair telephone lines in the common cable that actively carry DSL communication signals to DSL service subscribers; collecting a first sample of physical line characteristics for each of the twisted pair telephone lines in the group of active DSL lines at a first time; collecting a second sample of physical line characteristics for each of the twisted pair telephone lines in the group of active DSL lines at a second time; calculating a physical line characteristic variance for each of the twisted pair telephone lines in the group of active DSL lines by comparing the first and second samples of physical line characteristics for each respective twisted pair telephone line in the group of active DSL lines; tagging as impaired any of the twisted pair telephone lines in the group of active DSL lines having a physical line characteristic variance in excess of a variance threshold; and indicating a defect in the common cable based on a quantity of the twisted pair telephone lines tagged as impaired.

In accordance with another alternative embodiment, there is a method at a fault detection server having at least a processor and a memory, in which the method includes: identifying a group of Digital Subscriber Lines (DSL lines) within a common cable; determining baseline of physical line characteristics for each of the DSL lines in the group; collecting current physical line characteristics for each of the DSL lines in the group; determining a physical line characteristics delta for each of the DSL lines in the group by comparing the current physical line characteristics to the baseline of physical line characteristics for each of the respective DSL lines; tagging as an impaired DSL line, any of the DSL lines in the group for which the physical line characteristics delta of the respective DSL line exceeds a threshold; and indicating a defect in the common cable based on a quantity of the DSL lines tagged as impaired DSL lines.

In accordance with another alternative embodiment, there is a method at a fault detection server having at least a processor and a memory, in which the method includes: identifying a group of Digital Subscriber Lines (DSL lines) within a common cable; collecting data representative of physical line characteristics for each of the DSL lines in the group over time; determining a physical line characteristics delta for each of the plurality of DSL lines in the group by comparing a physical line characteristic of the respective DSL line at a first time as recorded in the collected data with a same physical line characteristic of the respective DSL line at a second time as recorded in the collected data; tagging every DSL line in the group having its physical line characteristics delta in excess of a threshold as an impaired DSL line; and indicating a defect in the common cable based on a ratio of the DSL lines tagged as impaired DSL lines to a total quantity of DSL lines in the group.

In accordance with yet another alternative embodiment, there is a method at a fault detection server having at least a processor and a memory, in which the method includes: identifying a group of Digital Subscriber Lines (DSL lines) within a common cable; collecting data representative of physical line characteristics for each of the DSL lines in the group over time; determining a physical line characteristics delta for each of the plurality of DSL lines in the group by comparing a physical line characteristic of the respective DSL line at a first time as recorded in the collected data with a same physical line characteristic of the respective DSL line at a second time as recorded in the collected data; tagging every DSL line in the group having its physical line characteristics delta in excess of a threshold as an impaired DSL line; and indicating the common cable is wet or corroded based on a quantity of the DSL lines tagged as impaired.

In accordance with a particular embodiment, there is a distinct method at a fault detection server having at least a processor and a memory, in which the distinct method includes: collecting physical line characteristics data from a common cable over a period of time; determining aggregate characteristics for the common cable based on the physical line characteristics collected; determining a statistical baseline for cables of a DSL network within which the common cable operates; and indicating a defect in the common cable based on the aggregate characteristics for the common cable exceeding the statistical baseline by at least a threshold amount.

According to a related embodiment of the distinct method, the method's operations further include: performing long term analysis to indicate whether the common cable is a corroded cable by: collecting the physical line characteristics data from the common cable at a first time to establish the statistical baseline; collecting the physical line characteristics data again at a second time separated from the first time by a configurable time span; and in which indicating the defect in the common cable includes indicating the common cable is a corroded cable based on a delta of the aggregate characteristics for the common cable corresponding to each of the first and second times exceeds a threshold for change over a period of time elapsed by the first and second times of at least the configurable time span.

According to a related embodiment of the distinct method, the method's operations further include: performing long-term threshold analysis to indicate whether the common cable has a defect by: retrieving expected line characteristics for each of a plurality of DSL lines in the common cable based on one or more of upstream attenuation, downstream attenuation, known line length, or estimated line length for each of the respective DSL lines in the common cable; establishing the statistical baseline based on the expected line characteristics retrieved; and in which indicating the defect in the common cable includes comparing the expected line characteristics for each DSL line with the corresponding aggregate characteristics determined from the physical line characteristics of the DSL lines in the common cable.

According to a related embodiment of the distinct method, the method's operations further include: generating a corrected baseline of physical line characteristics for each of the DSL lines in the common cable by adjusting the baseline to account for expected and permissible seasonal variation and/or temperature variation; and in which indicating the defect in the common cable includes comparing the current physical line characteristics to the corrected baseline of physical line characteristics.

According to a related embodiment of the distinct method, adjusting the baseline to account for expected and permissible seasonal variation and/or temperature variations includes adjusting upstream and/or downstream attenuations recorded in the baseline based on any of statistical temperature fluctuations, historical temperature fluctuations, current temperature fluctuations, geographic region, or season.

According to a related embodiment of the distinct method, collecting the physical line characteristics from the common cable includes collecting the physical line characteristics over a period of time defined by an analysis span for the common cable; in which the method further includes dividing the analysis span into N intervals of equal or unequal intervals; and in which indicating the defect in the common cable is based further on analysis of the physical line characteristics for the respective DSL lines from a plurality of the N intervals.

Figure 5:
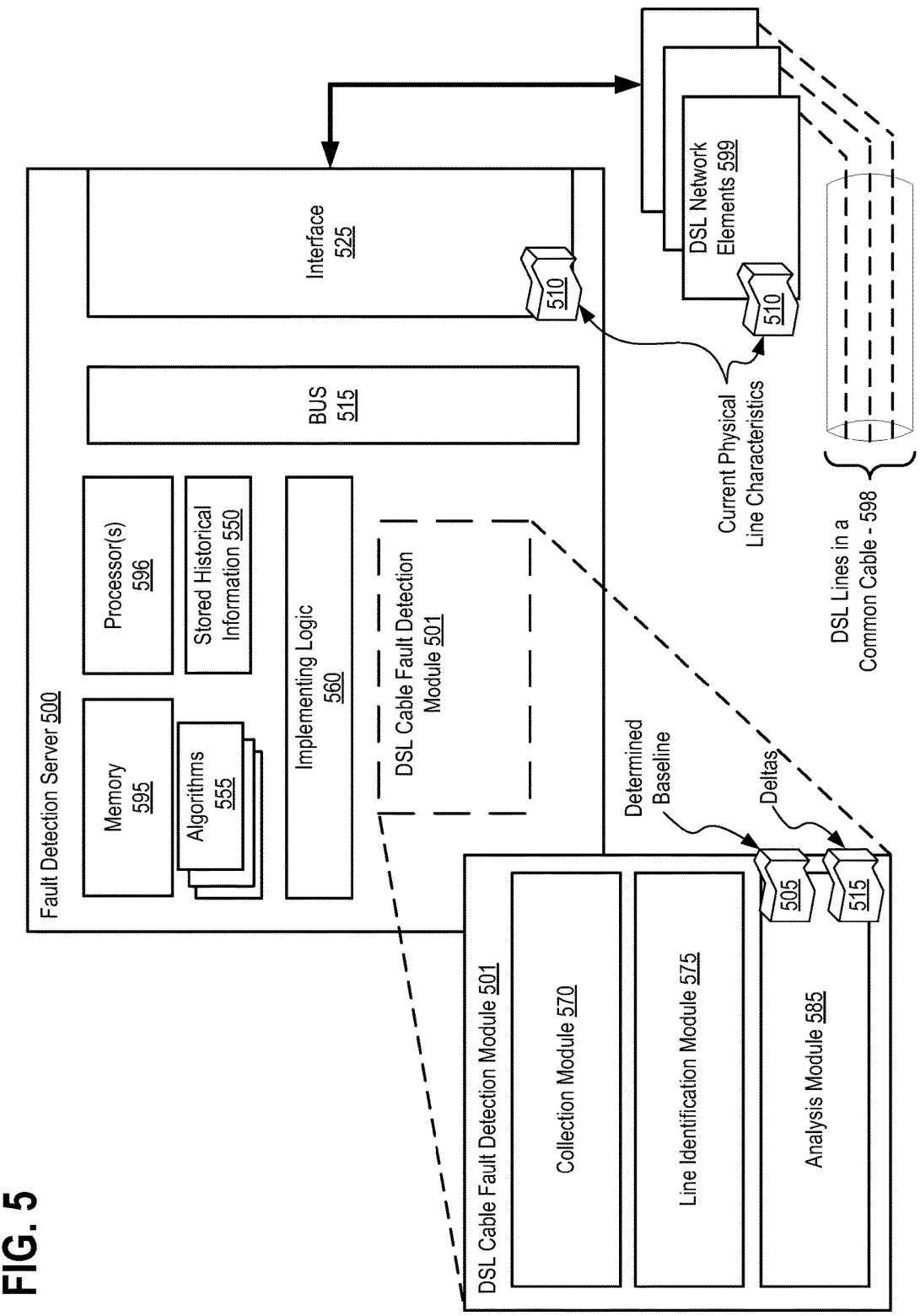
FIG. 5 illustrates a diagrammatic representation of a fault detection server in accordance with which embodiments may operate, be installed, integrated, or configured.

FIG. 5 illustrates a diagrammatic representation of a fault detection server 500 in accordance with which embodiments may operate, be installed, integrated, or configured.

In one embodiment, fault detection server 500 includes a memory 595 and a processor or processors 596. For example, memory 595 may store instructions to be executed and processor(s) 596 may execute such instructions. Processor(s) 596 may also implement or execute implementing logic 560 having logic to implement the methodologies discussed herein. Fault detection server 500 includes communication bus(es) 515 to transfer transactions, physical and operational line characteristics, instructions, requests, and data within fault detection server 500 among a plurality of peripheral devices communicably interfaced with one or more communication buses 515. Fault detection server 500 further includes interface 525, for example, to receive requests, return responses, issue test probes, request information, status, and otherwise interface with DSL network elements 599 and other network elements located separately from fault detection server 500.

In some embodiments, management interface 525 communicates information via an out-of-band connection separate from DSL line based communications, where "in-band" communications are communications that traverse the same communication means as payload data (e.g., content) being exchanged between DSL network elements and other devices and where "out-of-band" communications are communications that traverse an isolated communication means, separate from the mechanism for communicating the payload data. An out-of-band connection may serve as a redundant or backup interface over which to communicate control data between the fault detection server 500 and other DSL network elements 599 or between the fault detection server 500 and a third party service provider. In certain embodiments, the fault detection server 500 communicates with remotely located DSL network elements 599 via a public Internet using the interface 525 depicted.

Stored historical information 550 collected by fault detection server 500 or received from other DSL network elements 599 may be stored upon a hard drive, a persistent data store, a database, or other storage location within fault detection server. For instance, stored historical information 550 may include statistically derived baseline data, previously collected physical characteristics for DSL lines and previously collected operational characteristics for DSL lines. Algorithms 555 may be utilized to implement or complement the methodologies described herein by, for example, providing a wet cable algorithm, a cable level fault algorithm, a corroded or rotten cable algorithm, or other stored algorithmic functionality.

Distinct within fault detection server is DSL cable fault detection module 501 which includes collection module 570, line identification module 575, and analysis module 585. The DSL cable fault detection module 501 may be installed and configured in a fault detection server 500 as is depicted by FIG. 5, or provided separately so as to operate in conjunction with appropriate implementing logic 560 or other software.

In accordance with one embodiment there is a fault detection server 500 having a processor 596 and a memory 595 therein, in which the fault detection server further includes: an interface 525 to communicatively link the fault detection server 500 to a DSL network having a plurality of Digital Subscriber Lines (DSL lines) divided amongst a plurality of cables; a line identification module 575 to identify a group of DSL lines within a common cable 598; an analysis module 585 to determine a baseline 505 of physical line characteristics for each of the DSL lines in the group; a collection module 570 to collect current physical line characteristics 510 for each of the DSL lines in the group; in which the analysis module 585 is to further determine a physical line characteristics delta 515 for each of the DSL lines in the group by comparing the current physical line characteristics 510 to the baseline 505 of physical line characteristics for each of the respective DSL lines; and in which the analysis module 585 is to further indicate a defect in the common cable based on a quantity of the DSL lines in the group for which the respective DSL line's physical line characteristics delta 515 exceeds a threshold.

In accordance with another embodiment of the fault detection server 500, a third party service provider implements and operates the fault detection server 500 at a location different than a DSL operator responsible for networking equipment (e.g., DSL network elements 599) to operate the DSL lines and different than a DSL services provider responsible for providing DSL communication services to DSL service customers. According to such an embodiment, the interface 525 of the fault detection server 500 communicatively links with the DSL lines over a public Internet through DSL networking elements 599 of the DSL system operator or the DSL services provider.

In accordance with another embodiment of the fault detection server 500, the analysis module 585 is to further determine the defect in the common cable is present based on a ratio of the DSL lines in the group for which the respective DSL line's physical line characteristics delta 515 exceeds the threshold to a total quantity of DSL lines in the group. In such an embodiment, the analysis module 585 is to indicate the defect in the common cable when the ratio exceeds a second threshold.

Figure 6:
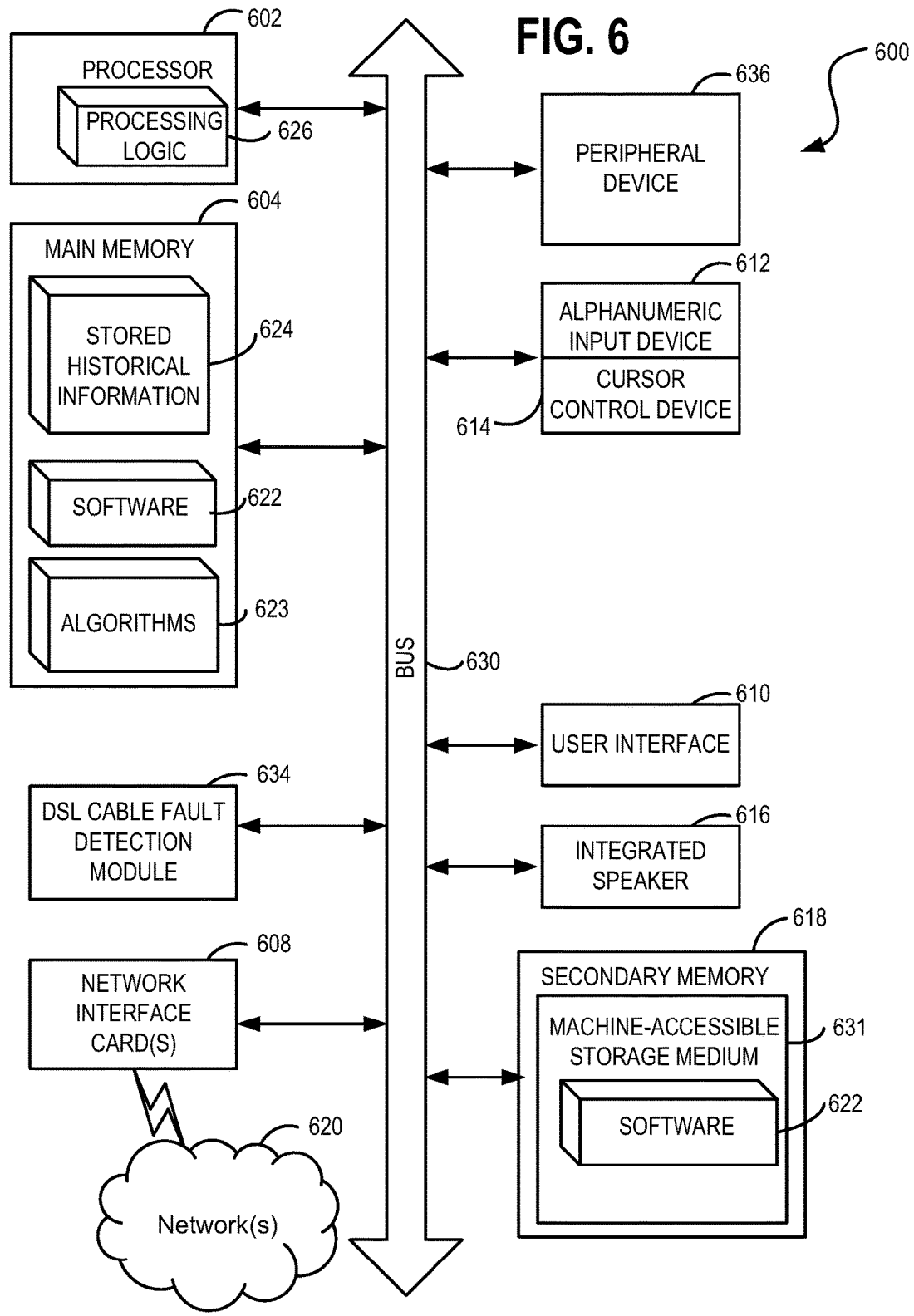
FIG. 6 illustrates a diagrammatic representation of a machine in the exemplary form of a computer system, in accordance with one embodiment.

FIG. 6 illustrates a diagrammatic representation of a machine 600 in the exemplary form of a computer system, in accordance with one embodiment, within which a set of instructions, for causing the machine 600 to perform any one or more of the methodologies discussed herein, may be executed. In alternative embodiments, the machine 600 may be connected, networked, interfaced, etc., with other machines in a Local Area Network (LAN), a Wide Area Network, an intranet, an extranet, or the Internet. The machine may operate in the capacity of a server, such as a fault detection server, or a client device in a client-server network environment, such as a DSL modem or CPE equipment, or as a peer machine in a peer-to-peer (or distributed) network environment. Certain embodiments of the machine may be in the form of a personal computer (PC), a tablet PC, a set top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and persistent data base implementations), which communicate with each other via a bus 630. Main memory 604 includes information and instructions and software program components necessary for performing and executing the functions with respect to the various embodiments of the systems, methods, and the DSL cable fault detection module 634 as described herein. Algorithms 623 may be triggered based on, for example, analysis of collected data including collected physical and operational line characteristics for DSL lines in a common cable of a DSL network or based on retrieved or derived statistical information including a statistically derived baseline. Stored historical information 624 may be kept within main memory 604 for use in evaluating the DSL lines and common cable undergoing evaluation and analysis as described. Algorithms 623 may be stored within main memory 604 for use when required or triggered by processing logic 626 and as determined by the DSL cable fault detection module 634. Main memory 604 and its sub-elements (e.g. 623 and 624) are operable in conjunction with processing logic 626 and/or software 622 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include one or more network interface cards 608 to communicatively interface the computer system 600 with one or more networks 620 from which information may be collected for analysis. For instance, network interface card 608 permits the computer system 600 to communicate via a public Internet to remotely located DSL network elements or via a wired backhaul as necessary. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.). The computer system 600 may perform the functions of an DSL cable fault detection module 634 capable of interfacing with remote DSL network elements and equipment to communicate with and collect information regarding DSL lines and common cables to be subjected to the methodologies described. The DSL cable fault detection module 634 is further capable of monitoring, collecting, analyzing, reporting information, and initiating, triggering, and executing various algorithms 623 including the execution of commands and instructions pursuant to such algorithms 623, etc.

The secondary memory 618 may include a non-transitory machine-readable storage medium (or more specifically a non-transitory machine-accessible storage medium) 631 on which is stored one or more sets of instructions (e.g., software 622) embodying any one or more of the methodologies or functions described herein. Software 622 may additionally or alternatively reside within main memory 604, and may further reside completely or at least partially within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

We claim:

1. A method at a fault detection server having at least a processor and a memory therein, wherein the method comprises:
   identifying a group of Digital Subscriber Lines (DSL lines) within a common cable;
   determining a baseline of physical line characteristics for each of the DSL lines in the group;
   collecting current physical line characteristics for each of the DSL lines in the group;
   determining a physical line characteristics delta for each of the DSL lines in the group by comparing current physical line characteristics to the baseline of physical line characteristics for each of the respective DSL lines; and
   indicating a defect in the common cable based on a quantity of the DSL lines in the group for which the respective DSL line's physical line characteristics delta exceeds one or more thresholds,
   wherein, the fault detection server is operable to identify a corresponding first defect in the common cable based on the quantity of the DSL lines in the group for which the respective DSL line's physical line characteristics delta exceeds a corresponding threshold based on a change between a first time and a second time of an associated first time period,
   wherein, the fault detection server is operable to identify a corresponding second defect in the common cable by comparing decision parameters with a corresponding set of thresholds, wherein the decision parameters are determined based on the physical line characteristics delta of each DSL line in N time intervals of an associated second time period.

2. The method of claim 1, further comprising:
   tagging as an impaired DSL line, any of the DSL lines in the group for which the physical line characteristics delta of the respective DSL line exceeds a threshold; and
   wherein indicating the defect in the common cable comprises indicating the defect based on the quantity of the DSL lines having been tagged as impaired.

3. The method of claim 1, wherein indicating the defect in the common cable comprises:
   determining the defect in the common cable is present based on a ratio of the DSL lines in the group for which the respective DSL line's physical line characteristics delta exceeds a threshold to a total quantity of DSL lines in the group; and
   indicating the defect in the common cable when the ratio exceeds a second threshold.

4. The method of claim 1, wherein identifying the group of DSL lines within the common cable comprises one of:
   identifying the group of DSL lines, wherein each of the DSL lines in the group are active DSL lines actively carrying DSL communication signals to DSL service subscribers;
   identifying the group of DSL lines, wherein each of the DSL lines in the group are inactive DSL lines allocated to DSL service subscribers; and
   identifying the group of DSL lines, wherein the DSL lines in the group include both active DSL lines and inactive DSL lines.

5. The method of claim 1, wherein indicating the defect in the common cable comprises one of:
   determining a majority of the DSL lines in the group possess the defect based on comparing the current physical line characteristics to the baseline of physical line characteristics;
   determining the quantity of the DSL lines in the group for which the respective DSL line's physical line characteristics delta exceeds a threshold is greater in number than an absolute threshold of permissibly defective DSL lines for the common cable; and
   determining two or more of the DSL lines in the group for which the respective DSL line's physical line characteristics delta exceeds a threshold reside within a threshold distance of one another based on Single-Ended Loop Test (SELT) results for the two or more DSL lines.

6. The method of claim 1:
   wherein identifying the group of DSL lines within the common cable comprises identifying any twisted pair telephone lines and any DSL lines within the common cable regardless of whether DSL data transmission activity is present on any of the twisted pair telephone lines and the DSL lines; and
   wherein the method further comprises including some but not all of the identified twisted pair telephone lines and the DSL lines to form the group of DSL lines or excluding some but not all of the identified twisted pair telephone lines and the DSL lines to form the group of DSL lines.

7. The method of claim 6, wherein the including or excluding comprises one of:
   including all DSL lines determined to be allocated to a DSL services subscriber regardless of whether the identified DSL lines are active or inactive;
   restricting the group of DSL lines to all active DSL lines within a single vectored group of DSL lines;
   restricting the group of DSL lines to all active DSL lines utilizing a specified DSL protocol, the DSL protocol being one of VDSL or ADSL;
   restricting the group of DSL lines to any lines within a single one of a plurality of DSL binders within the common cable, the DSL binder having a subset of the DSL lines or twisted pair telephone lines of the common cable therein;
   excluding from the group of DSL lines any DSL line associated with a vectored group of DSL lines;
   restricting the group of DSL lines to all active DSL lines in the common cable not affiliated with any vectored group;
   excluding any DSL lines or twisted pair telephone line previously known to have a defect or previously known to be associated with a technician dispatch during an evaluation period or within a threshold period of time or previously known to exhibit statistical outlier physical loop characteristics;
   excluding any twisted pair telephone lines transmitting analog voice signals in support of Plain Old Telephone Service (POTS) without concurrently carrying digital signals in support of DSL communication services; and
   including all DSL lines determined to be actively transmitting DSL communication data.

8. The method of claim 1, wherein collecting current physical line characteristics for each of the DSL lines in the group comprises running a Single-Ended Loop Test (SELT) against all possible twisted pair telephone lines within the common cable regardless of whether the twisted pair telephone lines are associated with inactive or active DSL lines.

9. The method of claim 8, further comprising:
   comparing locations associated with each twisted pair telephone line having a fault as identified via results of the SELT test to determine whether the locations compared are within a threshold distance.

10. The method of claim 1, further comprising:
    performing a Single-Ended Loop Test (SELT) against the DSL lines in the group; and
    correlating results of the SELT test to a geographic location representing where the SELT test indicates a fault exists on the common cable.

11. The method of claim 10, further comprising:
    triggering a notification indicating the common cable possesses the fault at the geographic location; and
    wherein triggering the notification comprises one or more of:
    sending an email notification;
    sending a Short Message Service (SMS) notification;
    posting the notification to a social network;
    triggering a graphical notification to a user interface;
    auto-generating a trouble ticket;
    auto-generating a technician dispatch report;
    auto-generating a work order; and
    auto-generating a list of tickets or a list of work orders.

12. The method of claim 1, wherein collecting current physical line characteristics for each of the DSL lines in the group comprises one or more of:
    collecting upstream attenuation for each of the DSL lines in the group;
    collecting downstream attenuation for each of the DSL lines in the group;
    collecting an estimated loop length for each of the DSL lines in the group;
    collecting Hlog for each of the DSL lines in the group, where the Hlog represents one or more of a transfer function magnitude for the respective DSL line, a measure of attenuation per Power Spectral Density (PSD) carrier of each respective DSL line, or a measure of insertion loss for the respective DSL line;
    collecting physical loop characteristics for each of the DSL lines in the group derived from Single-Ended Loop Test (SELT) results for the respective DSL line; and
    collecting physical loop characteristics for each of the DSL lines in the group derived from Dual-End Line Testing (DELT) results for the respective DSL line.

13. The method of claim 1, further comprising:
    storing the baseline of physical line characteristics for each of the DSL lines in a database as historical data for the respective DSL lines in the common cable.

14. The method of claim 13, wherein determining the baseline of physical line characteristics for each of the DSL lines in the group comprises determining the baseline based on (i) the historical data for the respective DSL lines in the common cable stored in the database and further based on one or more of (ii) newly observed current physical line characteristics for each of the DSL lines in the group or (iii) statistical data retrieved for each of the respective DSL lines in the group.

15. The method of claim 1, further comprising:
    determining a baseline of operational line characteristics for each of the DSL lines in the group;
    collecting current operational line characteristics for each of the DSL lines in the group;

determining an operational line characteristics delta for each of the DSL lines in the group by comparing the current operational line characteristics to the baseline of physical line characteristics for each of the respective DSL lines; and wherein indicating the defect in the common cable further comprises indicating the defect in the common cable based on the quantity of the DSL lines in the group for which the respective DSL line's operational line characteristics delta exceeds an operational change threshold in addition to the quantity of the DSL lines in the group for which the respective DSL line's physical line characteristics delta exceeds a first threshold.

16. The method of claim 15, wherein each respective DSL line's operational line characteristics comprises at least per-tone data of the respective DSL line; and wherein indicating the defect in the common cable is based at least in part on a change in the per-tone data of any one of the DSL line's per-tone data exceeding the operational change threshold.

17. The method of claim 1, further comprising:
storing the baseline of physical line characteristics for each of the DSL lines and a second baseline of operational line characteristics for each of the DSL lines in the group as historical data; and
wherein indicating the defect in the common cable further comprises indicating the defect in the common cable based at least in part on historical data representing both physical line characteristics and operational line characteristics for each of the DSL lines in the group.

18. The method of claim 1, wherein indicating the defect in the common cable is based further on a determined volatility in the current physical line characteristics for each of the DSL lines in the group compared to a volatility threshold.

19. The method of claim 1:
wherein the fault detection server is implemented by a third party service provider different than a DSL system operator responsible for networking equipment to operate the DSL lines and different than a DSL services provider responsible for providing DSL communication services to DSL service customers; and
wherein the fault detection server communicably interfaces to the DSL lines over a public Internet through DSL networking elements of the DSL system operator or the DSL services provider.

20. The method of claim 19, wherein the third party service provider provides cable-level fault detection services on common cables encompassing DSL lines as a subscription based cloud service.

21. Non-transitory computer readable storage media having instructions stored thereon that, when executed by a processor, the instructions cause the processor to perform operations including:
identifying a group of Digital Subscriber Lines (DSL lines) within a common cable;
determining a baseline of physical line characteristics for each of the DSL lines in the group;
collecting current physical line characteristics for each of the DSL lines in the group;
determining a physical line characteristics delta for each of the DSL lines in the group by comparing the current physical line characteristics to the baseline of physical line characteristics for each of the respective DSL lines; and
indicating a defect in the common cable based on a quantity of the DSL lines in the group for which the respective DSL line's physical line characteristics delta exceeds one or more thresholds, wherein, the fault detection server is operable to identify a corresponding first defect in the common cable based on the quantity of the DSL lines in the group for which the respective DSL line's physical line characteristics delta exceeds a corresponding threshold based on a change between a first time and a second time of an associated first time period, wherein, the fault detection server is operable to identify a corresponding second defect in the common cable by comparing decision parameters with a corresponding set of thresholds, wherein the decision parameters are determined based on the physical line characteristics delta of each DSL line in N time intervals of an associated second time period.

22. The non-transitory computer readable storage media of claim 21, wherein the instructions cause the processor to perform operations further comprising:
tagging as an impaired DSL line, any of the DSL lines in the group for which the physical line characteristics delta of the respective DSL line exceeds the threshold; and
wherein indicating the defect in the common cable comprises indicating the defect based on the quantity of the DSL lines having been tagged as impaired.

23. The non-transitory computer readable storage media of claim 21, wherein indicating the defect in the common cable comprises:
determining the defect in the common cable is present based on a ratio of the DSL lines in the group for which the respective DSL line's physical line characteristics delta exceeds the threshold to a total quantity of DSL lines in the group; and
indicating the defect in the common cable when the ratio exceeds a second threshold.

24. A fault detection server, comprising:
a processor;
a memory;
an interface to communicatively link the fault detection server to a DSL network having a plurality of Digital Subscriber Lines (DSL lines) divided amongst a plurality of cables;
a line identification module to identify a group of DSL lines within a common cable;
an analysis module to determine a baseline of physical line characteristics for each of the DSL lines in the group;
a collection module to collect current physical line characteristics for each of the DSL lines in the group;
the analysis module to further determine a physical line characteristics delta for each of the DSL lines in the group by comparing the current physical line characteristics to the baseline of physical line characteristics for each of the respective DSL lines; and
the analysis module to further indicate a defect in the common cable based on a quantity of the DSL lines in the group for which the respective DSL line's physical line characteristics delta exceeds a threshold,
wherein, the fault detection server is operable to identify wet cable faults, cable level faults and corroded cable faults on a per-line basis and an aggregate basis.

25. The fault detection server of claim 24:
wherein a third party service provider implements and operates the fault detection server at a location different than a DSL system operator responsible for networking equipment to operate the DSL lines and different than a DSL services provider responsible for providing DSL communication services to DSL service customers; and wherein the interface of the fault detection server communicatively links with the DSL lines over a public Internet through DSL networking elements of the DSL system operator or the DSL services provider.

26. The fault detection server of claim 24, wherein the analysis module to further indicate the defect in the common cable comprises:

the analysis module to further determine the defect in the common cable is present based on a ratio of the DSL lines in the group for which the respective DSL line's physical line characteristics delta exceeds the threshold to a total quantity of DSL lines in the group; and the analysis module to further indicate the defect in the common cable when the ratio exceeds a second threshold.

27. The method of claim 1, wherein,
when the processor identifies the corresponding first defect in the common cable based on the quantity of the DSL lines in the group for which the respective DSL line's physical line characteristics delta exceeds the corresponding threshold based on the change between the first time and the second time of the associated first time period, the common cable is a wet cable.

28. The method of claim 1, wherein,
when the fault detection server identifies the corresponding second defect in the common cable by comparing decision parameters with the corresponding set of thresholds, wherein the decision parameters are determined based on the physical line characteristics delta of each DSL line in N time intervals of the associated second time period, the common cable is a corroded cable.

29. The method of claim 1, wherein, the first time period is a shorter time period than the second time period.

* * * * *